US006832819B1

(12) United States Patent
Weihrauch

(10) Patent No.: US 6,832,819 B1
(45) Date of Patent: Dec. 21, 2004

(54) METHOD AND DEVICE FOR PRODUCING BRUSHES AND BRUSHES PRODUCED USING THE SAME

(75) Inventor: Georg Weihrauch, Wald-Michelbach (DE)

(73) Assignee: Coronet-Werke GmbH, Wald-Michelbach (DE)

( * ) Notice: Subject to any disclaimer, the term of this patent is extended or adjusted under 35 U.S.C. 154(b) by 331 days.

(21) Appl. No.: 10/018,353

(22) PCT Filed: Jul. 6, 2000

(86) PCT No.: PCT/EP00/06416

§ 371 (c)(1),
(2), (4) Date: Apr. 17, 2002

(87) PCT Pub. No.: WO01/03540

PCT Pub. Date: Jan. 18, 2001

(30) Foreign Application Priority Data

Jul. 13, 1999 (DE) .......................... 199 32 377

(51) Int. Cl.⁷ ................................. A46B 9/04
(52) U.S. Cl. ........................ 300/21; 15/167.1; 15/187
(58) Field of Search ................. 300/5, 21, 167.1, 300/187, 191.1–193

(56) References Cited

U.S. PATENT DOCUMENTS

| | | | | | |
|---|---|---|---|---|---|
| 3,633,974 | A | * | 1/1972 | Lewis, Jr. | 300/21 |
| 4,500,939 | A | * | 2/1985 | Gueret | 361/221 |
| 4,619,485 | A | * | 10/1986 | Lewis, Jr. | 300/21 |
| 4,635,313 | A | * | 1/1987 | Fassler et al. | 15/193 |
| 6,036,277 | A | * | 3/2000 | Weihrauch | 300/21 |
| 6,220,672 | B1 | * | 4/2001 | Weihrauch | 300/21 |
| 6,641,764 | B2 | * | 11/2003 | Lanvers | 264/157 |

FOREIGN PATENT DOCUMENTS

| | | |
|---|---|---|
| DE | 2 109 972 | 10/1971 |
| DE | 25 39 417 | 3/1976 |
| DE | 2539417 | * 3/1976 |
| DE | 197 38 256 | 3/1999 |
| DE | 198 18 553 | 8/1999 |
| EP | 0 326 634 | 8/1989 |
| EP | 0 405 204 | 1/1991 |
| EP | 0 577 656 | 1/1994 |
| JP | 10-52317 | * 2/1998 |
| WO | WO 97 25 899 | 7/1997 |

* cited by examiner

Primary Examiner—Terrence R. Till
(74) Attorney, Agent, or Firm—Paul Vincent

(57) ABSTRACT

A method for the manufacture of brushes with a plastic bristle carrier and a bristle configuration of individual or bundlewise-combined plastic bristles is proposed, in that the fastening-side ends of the bristles or bundles are melted to a thickening, thickenings of adjacent bristles or bundles are interconnected by after shaping and displacement of the plastics material and the connections are subsequently embedded in the plastics material of the bristle carrier. The thickenings are shaped by means of a mold to a clearly defined support structure of webs connecting adjacent thickenings and subsequently the support structure and the bristles projecting over the same are embedded by a short length in the plastics material of the bristle carrier. An apparatus for performing such a method and a brush manufactured by such a method are also proposed.

25 Claims, 4 Drawing Sheets

METHOD AND DEVICE FOR PRODUCING BRUSHES AND BRUSHES PRODUCED USING THE SAME

BACKGROUND OF THE INVENTION

The invention relates to a method for the manufacture of brushes with a plastic bristle carrier and a bristle configuration, fastened thereto and comprising individual or bundlewise-combined plastic bristles, in that the fastening side ends of the bristles or bundles are melted to a thickening, thickenings of adjacent bundles are interconnected by after shaping and displacement of the plastic mass and the connections are subsequently embedded in the plastics material of the bristle carrier. The invention is also directed at an apparatus for performing the method and to brushes manufactured according to the method.

The special features and problems described hereinafter using the example of toothbrushes apply equally to numerous hygiene brushes, as well as various other brushes for different uses. However, the prior art in connection with toothbrushes is the furthest advanced and consequently special reference is made thereto.

Modern dental medicine requires toothbrushes with a sensitive bristle action, the bristle configuration being adaptable to the greatest possible extent to the cleaning faces (teeth and interdental gaps) and massaging faces (gingiva), so as on the one hand to not only follow the spherical tooth surfaces on cleaning, but also to cover the desired interdental gaps and simultaneously avoiding injury during the desired massaging of the gingiva.

The requirement of reaching with the bristles the areas of the oral cavity to be cleaned and massaged on the one hand requires a certain length of the bristles, whilst on the other the complete overall height (bristle length plus overall height of the brush head) is to be kept low, so as to ensure an optimum bristle action even in the confined circumstances of the oral cavity. As exclusively the bristles decisive for the cleaning and massaging action and the bristle carrier makes no contribution thereto, the aim is to keep the overall height of the bristle carrier as small as possible. A limit is placed on this in that the bristles must have an adequate embedding length in order to offer the necessary resistance to pulling out oral extraction. Bristles or even bristle bundles which are released from the bristle configuration not only have an unpleasant effect in the oral cavity, but can even lead to health hazards in the gastrointestinal tract if swallowed. The in part opposing requirements for high extraction resistance and low overall height can only be fulfilled with difficulty.

At present brushware and in particular toothbrushes is still preponderantly made using conventional punching technology, i.e. the bundles are looped and fastened by anchoring in prepared bristle carrier holes. This procedure requires a bristle carrier overall height of at least 4 to 6 mm.

Toothbrushes produced by punching technology are only able to inadequately fulfil modern hygiene demands due to the existing gaps in the vicinity of the bristle fastening and the resulting inclusion of dirt and bacteria.

Substantially hygienically satisfactory toothbrushes can be produced by molding processes or thermoplastic joining processes, to which the method according to the independent claims relates. The fastening-side ends of the bristles are then provided with thickenings with which they are either pressed or shaped into the soft plastic mass of the bristle carrier or are placed in an injection mould, in which the bristle carrier molten mass is injection molded around the thickenings. This makes it possible to attain overall bristle carrier heights of 3.0 to 4.5. The limit is determined here again by the bristle embedding length offering the necessary extraction resistance. The requirement for a limited overall bristle carrier height is more particularly in conflict with the requirements of an adequate extraction resistance if account has to be taken of the further requirement in modern dentistry for a flexible behavior of the bristle configuration. This presupposes a corresponding flexibility of the bristle carrier and consequently a specific plastic choice and/or design measures. Through the flexibilizing of the bristle carrier the extraction resistance of the bristles is reduced, because the bristles are no longer held in a rigid environment. This more particularly applies if wholly or partly rubber-like materials, such as elastomers are used for the bristle carrier.

Purely constructional measures on the bristle carrier e.g. consist of a dividing up of the bristle carrier into areas in joint-like form (EP 577656, WO 92/17092). However, this generally leads to an increase in the overall height. The same applies in the case of toothbrushes in which the flexibilizing of the bristle configuration is achieved by means of elastomeric areas of the bristle carrier (WO 97/07707, WO 97/24048, WO 97/25899, WO 97/25900).

Attempts have already been made to resiliently mount the bristles in the bristle carrier (DE 19538569 A1) or to provide the bristle carrier with an elastomeric material and to weld the bristles to said material (DE 3628 722 A1, DE 19530057 A1). It is also known (WO 97/20484) to form the bristle carrier from a supporting skeleton of a relatively rigid plastic and fill the skeleton with an elastomer, the bristles being embedded in the skeleton material or in the elastomer. Here again no overall height reduction is obtained and the flexibility of the bristle configuration is restricted to the elastomeric marginal areas. It is also known (DE 19743556 A1) to subsequently separate the injection molded skeleton and then fill the same with elastomer.

In the case of rigid bristle carriers it is known (EP 405 204 B1, DE 19738256 A1) to introduce the bristle bundles into bores in a holding plate and melt same onto the back of the holding plate, whilst shaping the melt into corresponding depressions of the bores, so that all the bundles are connected at the back by means of a type of plate. This plate is then covered by the correspondingly recessed bristle carrier or it forms the bristle carrier together with the rigid holding plate. This construction in no way satisfies modern requirements regarding the flexibility of toothbrushes.

With toothbrushes having thermoplastically inserted or injection molded in bristle bundles with thickenings at the fastening-side end it is known (EP 150785 B1, EP 759711 B1) to after shape the thickenings on each bundle in order to widen same in plate-like manner and consequently increase the shear strength in the bristle carrier under the action of extraction forces, or also to shape the thickenings of adjacent bundles to form a cohesive thickening (EP 197384 B1, EP 326634 A1), exclusively strength aspects being in the foreground.

The problem of the invention is to propose a method for the manufacture of brushes which, in the case of an adequate bristle extraction resistance, allows a reduction of the overall height of the brush head. According to a further development a substantially controllable resilience of the bristle configuration is to be made possible.

SUMMARY OF THE INVENTION

According to the invention this problem is solved in that the thickenings are shaped by a mold to a clearly defined support structure of webs connecting adjacent thickenings and then the support structure and the bristles projecting over the same are embedded over a short length in the plastics material of the bristle carrier.

In the method according to the invention use is made of the plastics mass melted at the fastening-side end of the bristles or bundles in order to obtain a clearly defined support structure between the thickenings of the bundles or bristles introducing the tensile forces acting on the bristle bundles into the complete bristle carrier. It is no longer solely the shear strength of the bristle carrier material in the area of the thickenings which is decisive for the extraction resistance of the individual or bundlewise combined bristles, but larger areas of the bristle carrier significantly contribute thereto. If required, this makes it possible to reduce to a significant extent the bristle embedding length and in any case the overall height of the bristle carrier. Also in the case of highly flexible or rubber-like plastics for the bristle carrier limited embedding lengths can be implemented. Whereas with brushes with embedded bristles manufactured according to known methods it was possible to achieve an extraction resistance in the case of individual, vertical bristles of up to 150 g and in the case of bundles up to 800 g, as a result of the inventive method the extraction resistance of the individual bristles can be increased to above 500 g and for bundles to above 2000 g. The hitherto minimum possible embedding length of 0.5 mm can be reduced to 0.25 mm, i.e. by half.

The support structure necessary for the desired extraction resistance can be produced independently of the spacing of the bundles or individual bristles within the bristle configuration and also independently of the bundle diameter, which was not possible up to now with the known methods.

According to a preferred development, between the thickenings and the webs connecting them are formed plastic-free recesses, which during the molding or injection molding of the bristle carrier or during the thermoplastic joining process allow a complete flow round of the support structure and consequently ensure a firm anchoring of the bristle configuration.

According to a preferred variant of the method the thickenings are supported on their bristle side and the plastics mass displaced from the thickenings during shaping for forming the support structure is controlled against the support by the closing pressure of the mold.

Due to the shaping contour of the mold and the control of the flow pressure the plastics mass displaced from the thickenings can be distributed in planned manner with respect to the desired support structure and the desired cross-sections can be implemented in the webs of the support structure.

Another preferred variant of the method according to the invention is characterized in that the plastics mass displaced during shaping from the thickenings for the formation of the support structure is controlled by the bristle length melted in the thickenings.

This method is particularly advantageous if the bristle configuration comprises bundles having a differing cross-section, individual, vertical bristles and bristles with different spacings. These inequalities are compensated by the melting of a varying bristle length, in that the mass available for displacement is controlled.

In the method according to the invention it is possible to proceed in such a way that following the initial melting of the fastening-side ends of the bristles or bundles, the thickenings are shaped with a time lag in a still plastic state to the connections. The shaping forces are relatively low in this method.

Instead it is possible to proceed in such a way that following the initial melting of the fastening-side ends of the bristles or bundles, the thickenings are shaped with a time lag in the still ductile state to the connections. In this method variant only a narrow or confined union is produced in the area of the thickenings and optionally a positive engagement. However, the necessary increase in the extraction resistance can still be obtained in this way.

The method according to the invention is particularly suitable for the manufacture of toothbrushes or hygiene brushes, where a highly flexible bristle configuration is desired. In such a case the procedure is such that for obtaining a predetermined flexibility of the bristle configuration, the moment of inertia of the bristle carrier in the bending axis of the bristle configuration and the plastics material of the bristle carrier are so selected with respect to the modulus of elasticity thereof that the flexibility of the bristle carrier alone is greater than the predetermined flexibility of the bristle configuration, and that the number of connections of individual bristles and/or bundles and their moment of inertia acting in the bending axis in conjunction with the moment of inertia of the thickenings can at least locally be selected in such a way that the flexibility of the bristle carrier is damped to the predetermined amount for the bristle configuration.

As has been intimated herein before, the inventive method is based an a prior art such as is e.g. described in EP 197 384 B1 and EP 336634 A1. Unlike in this prior art, which does not involve itself further with the elasticity of the bristle configuration, in the inventive method a flexibility (elasticity) is given to the bristle carrier which is greater than that required for the particular need. This flexibility is obtained by the choice of the material, which can e.g. be a highly elastic thermoplastic material, an elastomer or the like and is predetermined in that the bristle carrier is given a correspondingly low moment of inertia with respect to the bending axis, which generally coincides with the longitudinal axis of the toothbrush. In such a bristle carrier having a correspondingly low moment of inertia with respect to the bending axis and/or undergoes a pronounced shape change during use, it is not possible to guarantee the necessary extraction resistance. The method according to the invention deals with this problem in that the connections of individual bristles and/or bundles obtained through the shaping of the thickenings have their number and their moment of inertia acting in the bending axis, whilst taking account of the moment of inertia of the thickenings, designed in such a way that the greater flexibility of the bristle carrier is damped, so as in this way to give the bristle configuration the predetermined flexibility. These method measures need only be locally provided on the bristle head in order to produce clearly defined bending areas in and transversely to the longitudinal axis of the bristle head.

As the connections are essentially only intended to contribute to an increase in the shear strength and it is consequently mainly a question of the plane of shear and the volume available for shearing, the thickenings can be shaped in the vicinity of the webs to a cross-section, whose effective moment of inertia is lower than that of the thickenings. This measure is aided in that the bristles generally are made from a higher grade plastic than the bristle carrier and consequently the thickenings and webs or grids have better strength characteristics.

It is also possible for part of the webs, with respect to the moment of inertia, to be shaped to such an extent that they act as joints. In such areas preponderantly, if not exclusively, the higher flexibility of the bristle carrier has its effect, so that zonally there is a greater flexibility on the bristle configuration.

In a variant of the method according to the invention a support structure covering all the thickenings is pre-shaped from webs connecting adjacent thickenings, is applied to and connected with the thickenings and subsequently the support structure and the bristles are embedded over a short length in the plastics material of the bristle carrier.

This variant is particularly advantageous for large brushes, where vital significance is not attached to the overall height of the bristle carrier. It is also advantageous if for strength reasons, a different plastic is used for the support structure than the bristle material or also if a different material, e.g. a textile or wire mesh to be penetrated by the plastic of the thickenings is to be used. It is also possible to combine both methods, in that part of the support structure is produced by the displacement of plastics material from the thickenings and the missing part is either subsequently e.g. molded or injection molded on using a thermal process or connected as a pre-shaped part to the existing support structure.

The invention also relates to an apparatus for performing the method. Such an apparatus has a mounting support receiving the bristles and/or the bundles of the entire bristle configuration of the brush in channels, a device for supplying the bristles and/or bundles in the channels to a position in which their fastening-side ends project over the mouth of the channels. Such an apparatus also has a device for melting the fastening-side ends and a shaping device for after shaping the melted ends. Such apparatuses form part of the prior art in conjunction with the known methods described. According to the invention, such an apparatus is characterized in that the shaping device has a male die associated with each thickening for the lateral displacement of the plastics material of the thickenings and at least one shaping unit placed between the male dies and the closing unit for shaping the displaced plastic material to the connections between the thickenings.

Preferably said shaping device has at least one closing unit for forming plastic-free spaces between the male dies, projecting with respect to said male dies and which can be placed on the mounting support.

The male dies have a shaping surface, whose outline at least corresponds to the outline of the thickening at the fastening-side ends of the bristles. With the same the thickenings are shaped and in particular pressed flat, so that the plastics material is displaced in the area between the bristles or bundles, accompanied by the formation of the support structure. Between the male dies is located the closing unit, which is placed directly on the mounting support in order to limit the lateral spread of the displaced material, whilst the shaping unit covering the areas between the male dies and the closing unit brings about the shaping of the webs.

Preferably, at least the closing unit is in advance compared with the male dies and the shaping unit, so that initially those areas of the support structure into which the displaced material is not to penetrate are blocked off. In this embodiment the male dies and shaping unit can be constructed in one piece. It can alternatively be advantageous to resiliently support the shaping unit, so that in the case of a possibly fluctuating displaced material a compensation occurs. A separate control of the shaping unit and the male dies can also be advantageous.

According to an embodiment the shaping face of the shaping unit, at least in predetermined areas, can spring back with respect to the shaping faces of the male dies, so that in the area of the connections, the plastics material is located in a plane set back in the bristle carrier and consequently in the pressure zone during the deflection of the bristle carrier. Instead of this the shaping face of the shaping unit can project with respect to the shaping face of the male dies, so that the connections are more strongly displaced into the tension zone of the bristle carrier.

The male dies, closing unit and shaping unit can be constructed as a one-stage mold, so that the entire bristle configuration can be constructed in a single working stroke with this mold. The mounting support with the channels receiving the bristles and/or bundles advantageously simultaneously serves as an abutment for the mold.

The shaping device can additionally at least zonally be provided with a heating device in order to assist the flow of the displaced plastics material or in order to temper the plastic of the support structure.

According to a preferred development, the mounting support with the channels receiving the bristles and/or bundles simultaneously serves as part of a mold, particularly an injection mold for the bristle carrier, so that it shapes the bristle carrier on filling the mold on the side of the bristle configuration. Thus, the mounting support simultaneously serves for the positioning of the bristles or bundles in accordance with the configuration thereof in the bristle configuration and for the formation of the thickenings and support structure for the bristles or bundles and finally as a molding during the manufacture of the bristle carrier.

For this purpose the bristles and/or bundles are displaceable in the direction of the thickenings in the mounting support and the thickenings can be adjusted in the mold to the desired embedding depth in the bristle carrier, said embedding depth being of a minimum nature as a result of the inventive measures, so as to bring about a minimum overall height at the bristle carrier, but still ensuring an adequate extraction resistance of the bristles.

The invention also relates to a brush manufactured according to the above described method and which, as is known per se, comprises a plastic bristle carrier and a bristle configuration of individual or bundlewise-combined plastic bristles, which are provided at their fastening-side ends with melted on thickenings by means of which they are embedded in the bristle carrier. According to the invention, such a brush is characterized in that the bristles and/or bundles of the entire bristle configuration by means of webs connecting the thickenings from the plastic of the bristles forming a support structure increasing the extraction resistance.

The support structure can at least zonally have a smaller thickness than that of the thickenings and can optionally be so thin that zonally joints are formed, which in particular aid a zonal flexibility of the bristle carrier.

The extraction resistance and also the flexibility of the bristle carrier can also be influenced in that the webs are at least zonally located in a different plane to the thickenings. If the webs are e.g. located in the neutral bending axis, they are least stressed by centrifugal forces, whereas they act as a damping member when located in the pressure or tension zone.

The invention is described in greater detail hereinafter relative to embodiments and the attached drawings, wherein show:

DESCRIPTION OF THE PREFERRED EMBODIMENT

Figure 1:
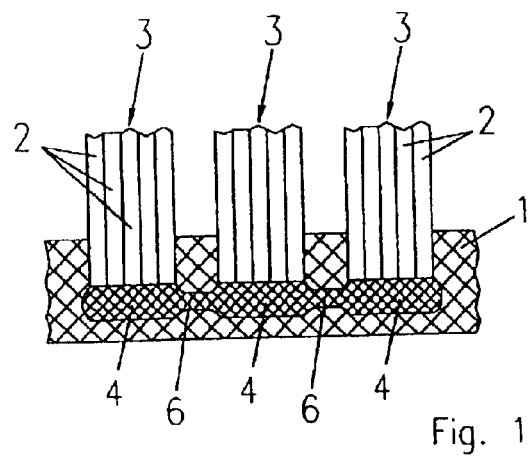
FIG. 1 a detail of a brush.
Figure 2:
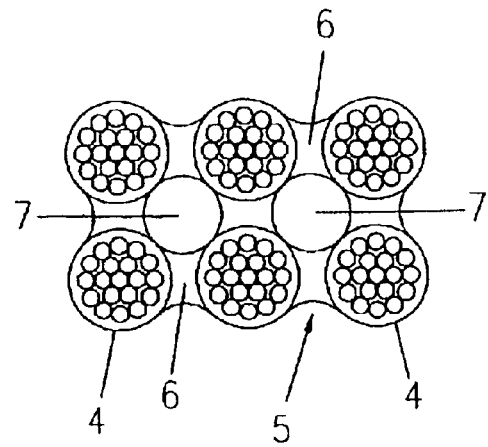
FIG. 2 a plan view of the bristle configuration according to FIG. 1, without bristle carrier.
Figure 3:
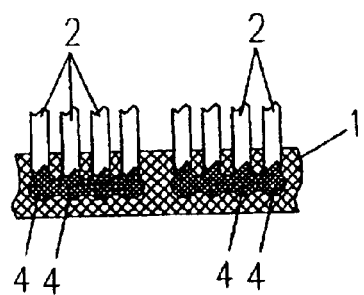
FIG. 3 a detail of a brush with individual, vertical bristles.
Figure 4:
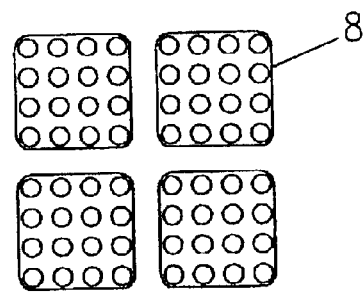
FIG. 4 a plan view of the bristle configuration of the brush according to FIG. 3, without the bristle carrier.
Figure 5:
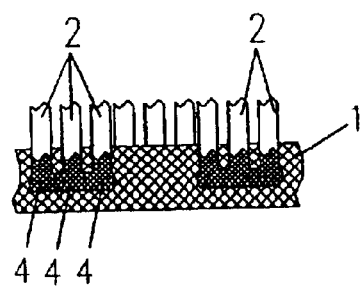
FIG. 5 a detail of another embodiment of a brush with individual bristles.
Figure 6:
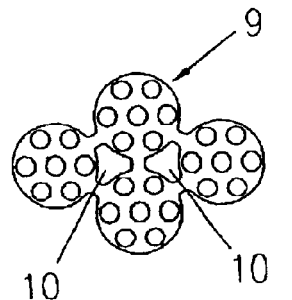
FIG. 6 a plan view of the bristle configuration without bristle carrier of the embodiment of FIG. 5.
Figure 7:
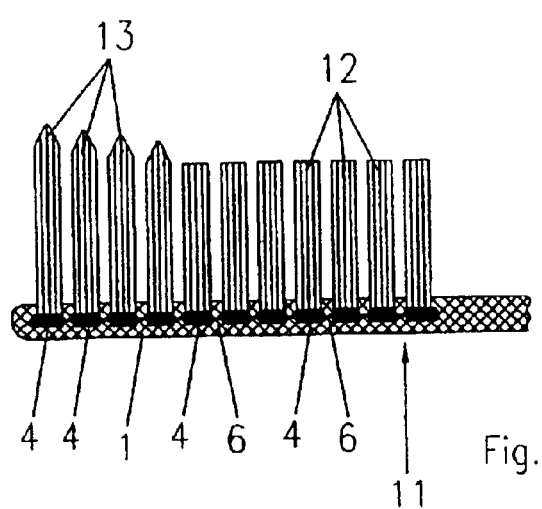
FIG. 7 a larger scale section through the head of a toothbrush.

The embodiments of brushes shown in FIGS. 1 to 11 are manufactured in accordance with the method of the invention. The brush according to FIG. 1 comprises a plastic bristle carrier 1 and bristles 2 combined to bundles 3 and which are melted to thickenings 4 at their fastening-side ends. By means of said thickenings 4 the bundles 3 are embedded, e.g. injection molded into the bristle carrier 1, or are inserted in a thermoplastic process. The thickenings 4 of the bundles 3 are connected by means of a clearly defined support structure 5, which in the represented embodiment comprises webs 6 connecting neighboring thickenings 4 and plastic-free recesses 7 located between the same.

In the embodiments according to FIGS. 3 to 6 individual, vertical bristles 2 are provided at their fastening-side ends with thickenings 4 by melting the bristle ends and shaped by the displacement of plastics material from the thickenings 4 to a plate-like support structure 8, the individual bristles 2 being combined into groups. In the embodiment according to FIG. 5 the individual bristles 2 are mutually displaced, e.g. in the form of circular groups and once again thickenings 4 are shaped to a support structure 9 with recesses 10.

Figure 8:
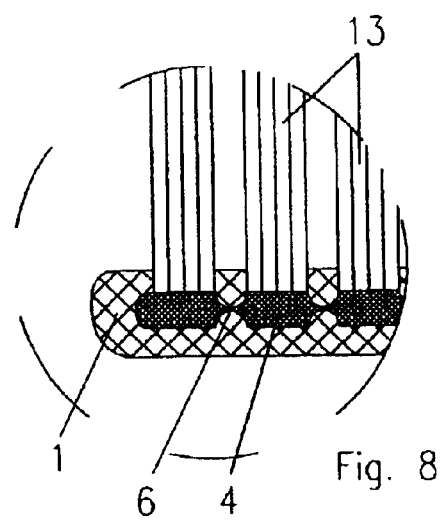
FIG. 8 a larger scale detail of the section of FIG. 6.
Figure 9:
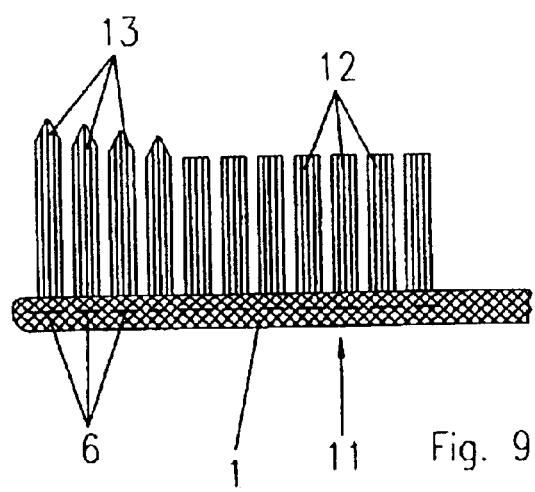
FIG. 9 a section corresponding to FIG. 7 in a plane between adjacent bundles.
Figure 10:
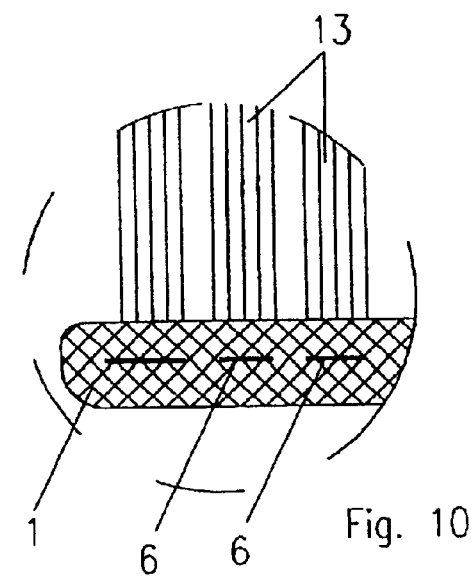
FIG. 10 a larger scale detail of the section of FIG. 9.
Figure 11:
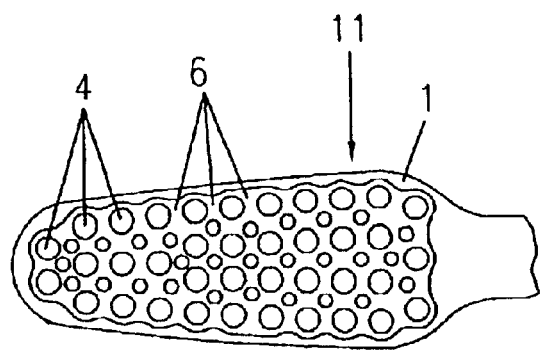
FIG. 11 a plan view of the bristle configuration of the toothbrush of FIGS. 7 and 9.

FIGS. 7 to 10 show the head 11 of a toothbrush with bundles 12, 13 having different shapes at the use-side end and which are also of different lengths. The fastening-side ends of said bundles are once again melted to form thickenings 4 and are interconnected by means of webs 6 through the displacement of the plastics material and which consequently form a support structure for the entire bristle configuration of bundles 12 and 13. The support structure and a short length of the bundles 12, 13 are once again embedded in the bristle carrier 1 of the brush head 11. The webs 6 between the thickenings can, as shown in FIGS. 8 and 10, be kept very thin and then form a type of joint between the individual bundles 12, 13, but still contribute to increasing the extraction resistance of the bundles 12, 13.

Figure 12:
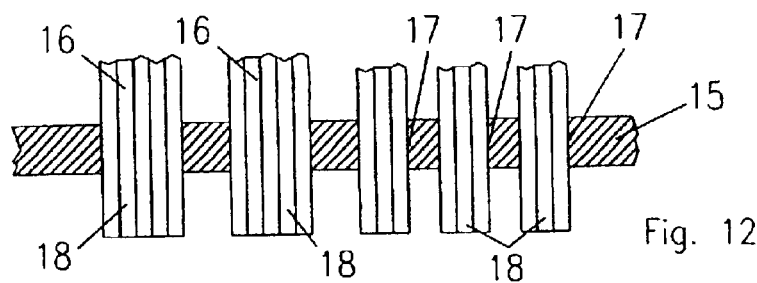
FIG. 12 a section through a mounting support for the bundles in a first manufacturing stage.
Figure 13:
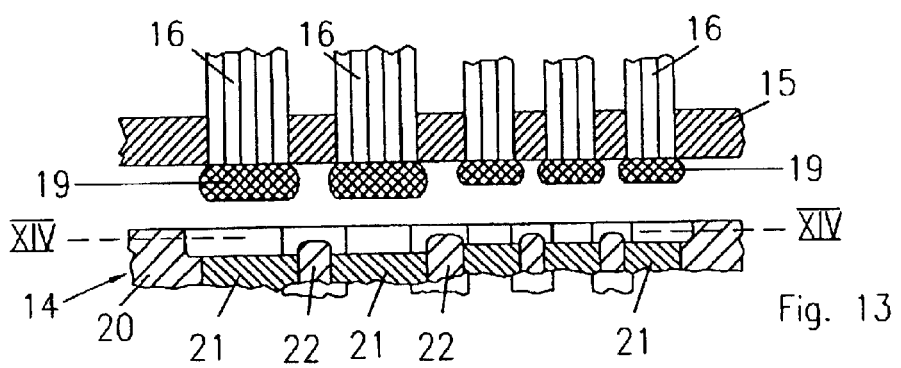
FIG. 13 a section through a mold in a second manufacturing stage.
Figure 14:
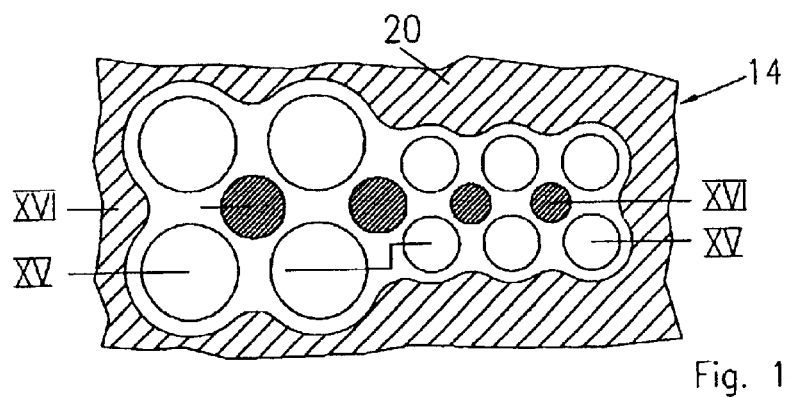
FIG. 14 section XIV—XIV according to FIG. 13.
Figure 15:
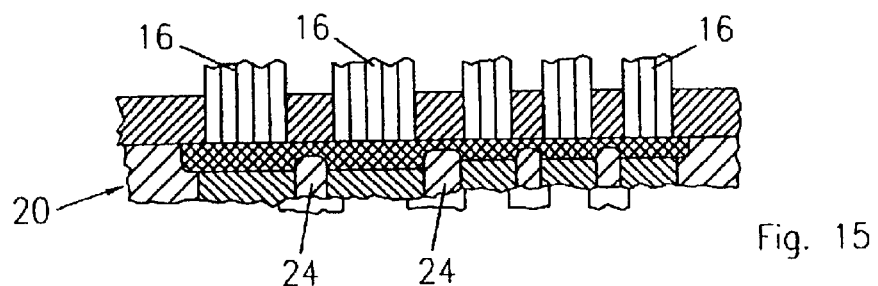
FIG. 15 a section XV—XV according to FIG. 14.
Figure 16:
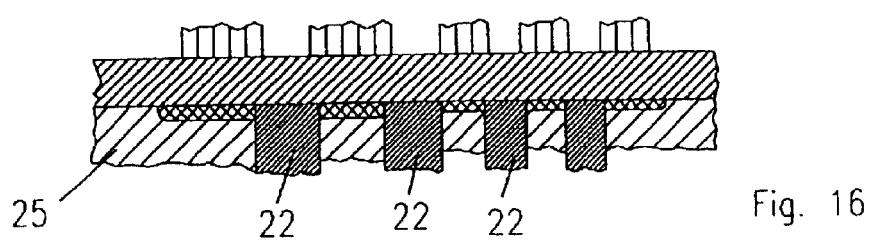
FIG. 16 a section XVI—XVI according to FIG. 14.
Figure 17:
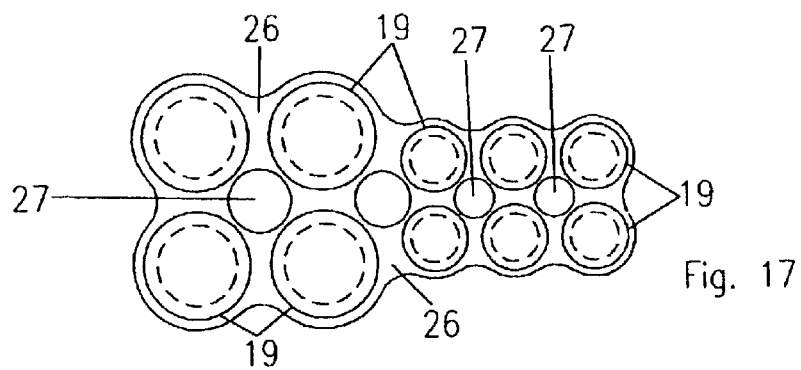
FIG. 17 a view of the back of the support structure of the bristle configuration manufactured in accordance with FIGS. 12 to 16.
Figure 18:
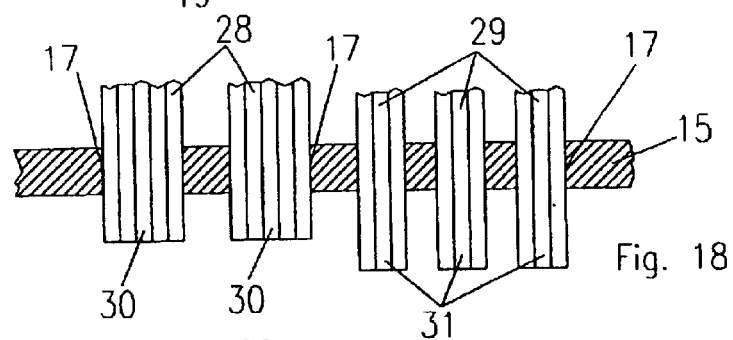
FIG. 18 a representation of the mounting support corresponding to FIG. 12 in a method variant.

FIGS. 12 to 16 show an apparatus for performing the method or for the manufacture of the brushes according to FIGS. 1 to 11. FIG. 12 shows a mounting support 15, where the bundles 16 forming a bristle configuration and which optionally have different diameters, are placed in channels 17. The bundles 16 are introduced by means of a not shown supply device into the channels 17 of the mounting support 15 and are appropriately fixed there in correspondingly narrow cross-sections of the channels 17 or the like by clips, plugs, etc. The supply takes place in such a way that the fastening-side ends 18 of the bundles 16 project over the mounting support 15. These fastening-side ends 18 are then melted in known manner, so that thickenings 19 are formed from the molten mass. A shaping device 14 (FIGS. 13 and 14) then comes into action and comprises individual male dies 21 associated with the thickenings and a closing unit formed from individual dies 22, which project over the male dies 21 and are placed directly on the surface of the mounting support 15 between the thickenings 19. The male dies 21 also act against the thickenings 19 and displace the still soft plastic, but at least ductile plastics material to the side and said material is prevented from flowing further by the dies 22. In the area between the male dies 21 and the closing dies 22 can be provided further male dies 24 or a complete shaping unit 25, which displaces the plastics material to a clearly defined support structure, as shown in FIG. 17 in a view of the rear of the support structure. It comprises thickenings 19, the thinner webs 26 connecting the same and the intermediate recesses 27.

Figure 19:
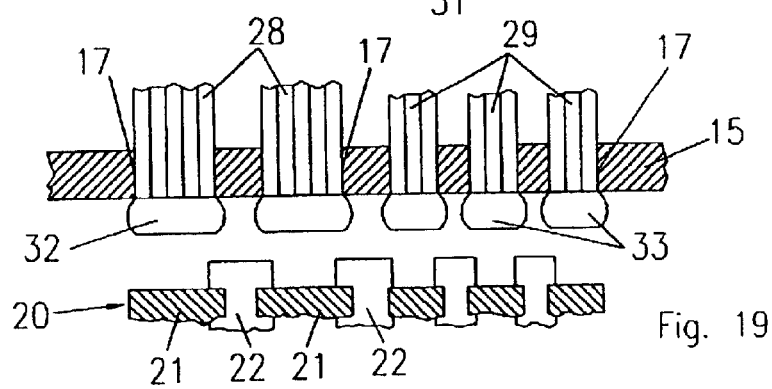
FIG. 19 the mounting support with part of the mould in a further method stage.
Figure 20:
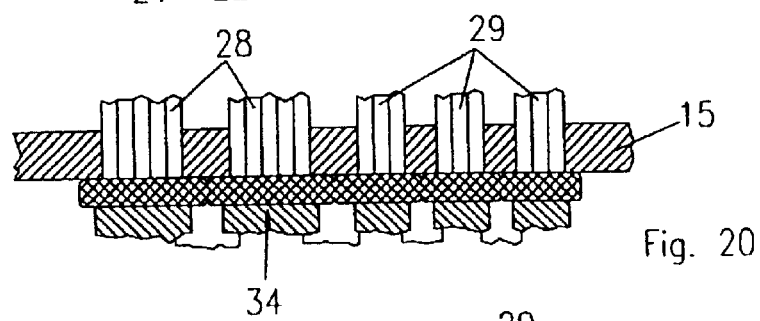
FIG. 20 a section with the mold closed in the bundle plane.
Figure 21:
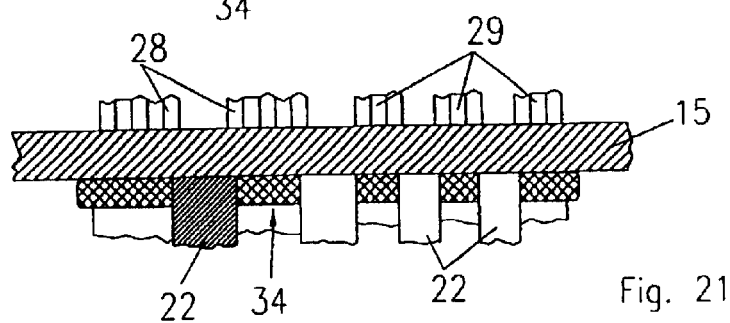
FIG. 21 a section of the closed mold in a plane between the bundles.

The control during the displacement of the plastics material from the thickenings 19 takes place through the shaping contour of the shaping device 14 in conjunction with the closing pressure of the mold 20 against the mounting support 15. A further control possibility is illustrated in FIGS. 19 to 21. Here the bristle configuration comprises bundles 28 and 29 having a different cross-section. With the fastening-side end 30 or 31 thereof they are introduced to a differing extent into the channel 17 of the mounting support 15. The bristles are in each case melted to the length projecting over the mounting support 15, so that taking account of the spacings between the bundles 28, 29 sufficient plastics material is made available to bridge the spacings through a uniform thickness support structure 34. The mold 20 once again comprises male dies 21 and closing dies 22. The male dies 21 once again displace the material from the thickenings 32, 33 in all the mold cavities with the exception of the areas blocked off by the closing dies 22. This makes it possible to produce the support structure 34 shown in FIGS. 20 and 21 with an approximately constant cross-section despite the different cross-sections of the bundles 28, 29 and different spacings between the same.

I claim:

1. A method for the manufacture of brushes having a plastic bristle carrier and a bristle stock of individual or bundled plastic bristles fastened thereto, the method comprising the steps of:

a) melting fastening-sided ends of the bristles or bundles into thickenings;

b) shaping and displacing plastic material of at least a portion of said thickenings in a mold to create at least a partial support structure web connecting together adjacent thickenings; and c) embedding said thickenings and said web through a short length in plastics material of said bristle carrier.

2. The method of claim 1, wherein said web defines plastic-free openings between said thickenings.

3. The method of claim 1, wherein a bristle side of said thickenings abuts a support and plastics material displacement of said thickenings during shaping for forming said support structure web is controlled by a closing pressure of said mold against said support.

4. The method of claim 1, wherein plastics material displacement from said thickenings during shaping for forming said support structure web is controlled by a length of bristles melted to form said thickenings.

5. The method of claim 1, wherein thickenings of more than two bristles or bristles bundles are shaped to a mutually connecting grid.

6. The method of claim 1, wherein step b) is performed with a time delay following step a), wherein said time delay being is selected such that said thickenings are still in a plastic state during step b).

7. The method of claim 1, wherein step b) is performed with a time delay following step a), said time delay being chosen such that said thickenings are still ductile during step b).

8. The method of claim 1, for the manufacture of toothbrushes or hygiene brushes, wherein for obtaining a desired flexibility of the bristle stock, a moment of inertia of said bristle carrier about a bending axis of the bristle stock and a modulus of elasticity of plastic of said bristle carrier are so selected that a flexibility of said bristle carrier alone exceeds a desired flexibility of the bristle stock, wherein a number of connections between individual bristles or bristle bundles and their effective moment of inertia about said bending axis, in conjunction with a moment of inertia of said thickenings, is at least locally selected in such a way that said flexibility of said bristle carrier is reduced to a value desired for the bristle stock.

9. The method of claim 1, wherein plastics material displaced from said thickenings is shaped in said web to a cross-section whose effective moment of inertia is lower than that of said thickenings.

10. The method of claim 1, wherein at least a portion of said web has a moment of inertia which imparts hinging properties to said web portion.

11. A method of claim 1, wherein step b) comprises shaping and displacing plastic material of a part of said thickenings to create a part of a support structure web connecting together adjacent thickenings, and further comprising joining a remaining part of a support structure web onto a remaining part of said thickenings to cover all of remaining thickenings and to connect together adjacent remaining thickenings, prior to step c).

12. The method of claim 11, wherein said remaining part of said support structure web is joined to said remaining thickenings by injection molding.

13. A method for the manufacture of brushes having a plastic bristle carrier and a bristle stock of individual or bundled plastic bristles fastened thereto, the method comprising steps of:

a) melting fastening-sided ends of the bristles or bundles into thickenings;

b) joining a support structure web onto at least a portion of said thickenings to cover thickenings and to connect together adjacent thickenings; and c) embedding said thickenings and said web through a short length in plastics material of said bristle carrier.

14. The method of claim 13, wherein said support structure web is joined to said thickenings by injection molding.

15. An apparatus for performing the method of the claim 1, the apparatus comprising:

a mounting support having channels for receiving the bristles or bristle bundles of a complete bristle stock of a toothbrush;

means for supplying the bristles or bristle bundles into said channels to a position in which their fastening-sided ends project past the mouths of said channels;

means for melting said fastening-side ends; and a shaping device having a male die associated with each thickening for lateral displacement of plastics material of said thickenings and at least one shaping unit located between said male dies for shaping said displaced plastics material into connections between said thickenings for forming said support structure web.

16. The apparatus of claim 15, wherein said shaping device comprises at least one closing unit having structures projecting past and between said male dies, said closing unit for placement on said mounting support to form plastic-free spaces between said dies.

17. The apparatus of claim 16, wherein said closing unit, said male dies and said shaping unit are portions of a one-piece mold.

18. The apparatus of claim 15, wherein at least the closing unit has structures in advance of said male dies and said shaping unit.

19. The apparatus of claim 18, wherein said male dies and said shaping unit are mutually integral.

20. The apparatus of claim 15, wherein said male dies and said shaping unit can be separately controlled.

21. The apparatus of claim 15, wherein, at least in predetermined areas, a shaping face of said shaping unit has structures which are retracted relative to a shaping faces of said male dies.

22. The apparatus of claim 15, wherein said mounting support having said channels receiving the bristles or bristle bundles simultaneously serves as an abutment for said shaping device.

23. The apparatus of claim 15, wherein said shaping device is at least zonally provided with a heating device.

24. The apparatus of claim 15, wherein said mounting support with said channels receiving the bristles or bristle bundles simultaneously forms part of a mold for said bristle carrier and, during a filling of said mold, shapes said bristle carrier at a bristle configuration side thereof.

25. The apparatus of claim 15, wherein the bristles or bristle bundles are displaceable in the mounting support in a direction of said thickenings to adjust said thickenings in a mold to a desired embedding depth in said bristle carrier.

* * * * *